United States Patent
Sekine et al.

(10) Patent No.: US 8,367,189 B2
(45) Date of Patent: Feb. 5, 2013

(54) PATTERN PRINTED TRANSPARENT SHEET

(75) Inventors: Keiko Sekine, Chiba (JP); Yuichi Miyazaki, Tokyo (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 1288 days.

(21) Appl. No.: 12/010,214

(22) Filed: Jan. 22, 2008

(65) Prior Publication Data

US 2008/0182041 A1  Jul. 31, 2008

(30) Foreign Application Priority Data

Jan. 23, 2007 (JP) ................ 2007-012836

(51) Int. Cl.
*B44F 1/06* (2006.01)

(52) U.S. Cl. ................ 428/211.1; 428/28

(58) Field of Classification Search ......... 345/156–183; 428/29, 211.1
See application file for complete search history.

(56) References Cited

U.S. PATENT DOCUMENTS

| | | | |
|---|---|---|---|
| 4,410,570 A | | 10/1983 | Kreuzer et al. |
| 5,357,357 A | * | 10/1994 | Imazeki et al. .............. 428/1.31 |
| 5,434,687 A | * | 7/1995 | Kawata et al. .............. 349/96 |
| 5,560,864 A | | 10/1996 | Goulding |
| 5,780,629 A | | 7/1998 | Etzbach et al. |
| 5,798,147 A | | 8/1998 | Beck et al. |
| 6,136,225 A | | 10/2000 | Meyer et al. |
| 6,537,624 B1 | | 3/2003 | Suzuki et al. |
| 6,812,980 B2 | | 11/2004 | Karman |
| 2001/0036986 A1 | * | 11/2001 | Matsumura et al. .......... 524/265 |
| 2003/0087045 A1 | * | 5/2003 | Nakata et al. .............. 428/1.27 |
| 2007/0154718 A1 | * | 7/2007 | Silverman et al. ......... 428/411.1 |

FOREIGN PATENT DOCUMENTS

| | | |
|---|---|---|
| JP | 57-165480 A | 10/1982 |
| JP | 7-258638 A | 10/1995 |
| JP | 9-133810 A | 5/1997 |
| JP | 9-506088 A | 6/1997 |
| JP | 10-508882 A | 9/1998 |
| JP | 11-293252 A | 10/1999 |
| JP | 11-513019 A | 11/1999 |
| JP | 2001-005684 A | 1/2001 |
| JP | 2001-110045 A | 4/2001 |
| JP | 2001-243006 A | 9/2001 |
| JP | 2003-256137 A | 9/2003 |
| JP | 2004-519728 A | 7/2004 |
| JP | 2006-154865 A | 6/2006 |
| WO | WO 99/34242 A | 7/1999 |

* cited by examiner

*Primary Examiner* — Gerard Higgins
*Assistant Examiner* — Sathavaram I Reddy
(74) *Attorney, Agent, or Firm* — Smith Patent Office

(57) ABSTRACT

A non-visible light reflective pattern-printed transparent sheet having a broad read angle is provided. The above transparent sheet is a pattern-printed transparent sheet in which a transparent substrate comprises a base material and a primer layer, and a non-visible light reflective transparent pattern is printed on the surface of the primer layer; an ink constituting the transparent pattern described above contains a material having a wavelength selective reflectivity to a wavelength in an infrared or ultraviolet region; the primer layer described above comprises a primer composition repelling the ink described above; when a cross section obtained by cutting the transparent pattern described above in a face orthogonal to the above transparent substrate is observed under a scanning electron microscope, the transparent pattern described above comprises a multilayer structure comprising a fixed repeating cycle and having a curved part and reflect selectively one of a left circularly polarized light component and a right circularly polarized light component in an incident light.

13 Claims, 5 Drawing Sheets

Fig. 2-a
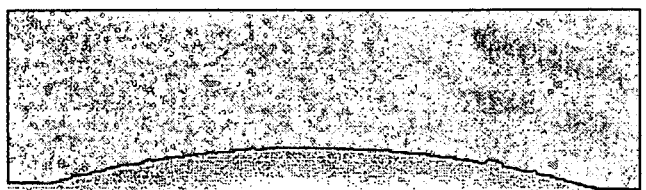
Fig. 2-b
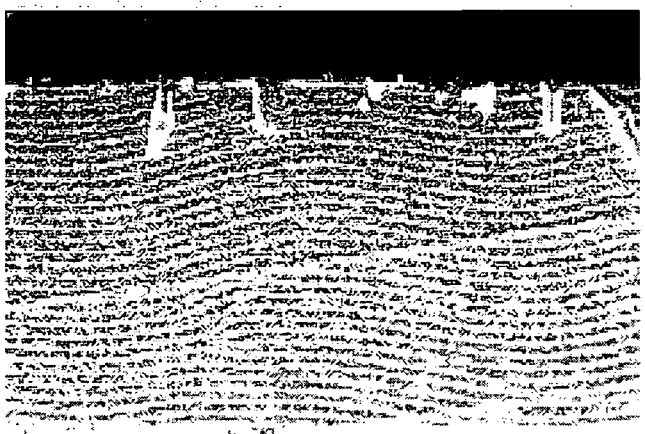
Fig. 2-c
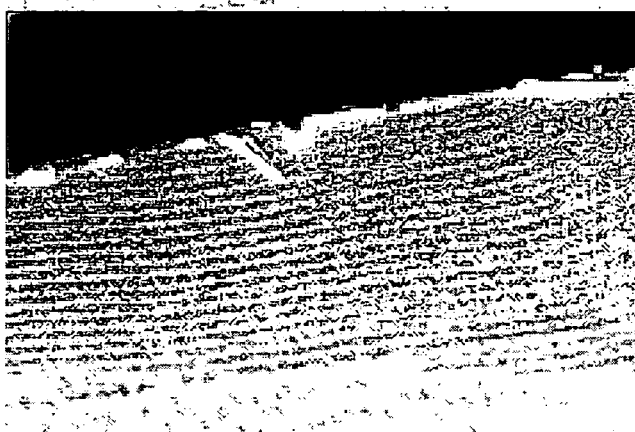
Fig. 2-d
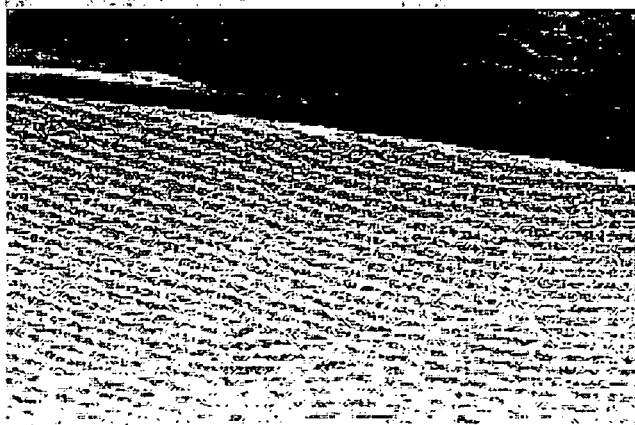

PATTERN PRINTED TRANSPARENT SHEET

BACKGROUND OF THE INVENTION

1. Field of the Invention

The present invention relates to a pattern-printed transparent sheet which is a member capable of being applied to a data input system of a type of handwriting directly on a screen of a display device and providing a coordinate detect means and which has particularly a broad read angle.

2. Related Art

In recent years, increased is necessity to convert handwritten characters, pictures and the like to electronic data which can be handled by information processing devices. In order to meet the above situations, it is considered to combine matters on which patterns reflecting an infrared ray and a UV ray being non-visible lights are printed as a position information for showing positions of input lines.

On the other hand, a device in which a position information are read by a pen type sensor and the like and input into an image display device of an information liquid crystalline high polymers disclosed in Japanese Patent Application Laid-Open No. 293252/1999 can be used as the liquid crystal polymers described above.

The chiral agent contained in the transparent ink used in the present invention is a material which has an asymmetric carbon atom and which forms a chiral nematic phase by mixing with a nematic liquid crystal, and it shall not specifically be restricted as long as it has a polymerizability. A material having an acrylate structure represented by Formula (12) is preferred since it is polymerizable by irradiation with a UV ray.

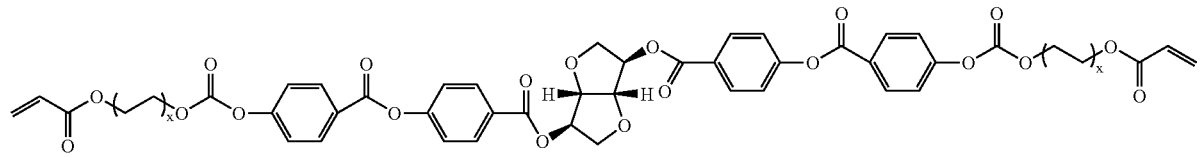

(12)

X is 2 to 5 (integer).

The property of reflecting an infrared ray by the transparent pattern in the present invention makes preferably use of, as described above, a wavelength selective reflectivity (the same principle as Bragg reflection in X-ray diffraction) of a liquid crystal material having a cholesteric structure. The selective reflection peak wavelength thereof (wavelength satisfying the Bragg reflection conditions) is determined by a pitch length of a cholesteric structure processing instrument includes, for example, a sheet disclosed in a patent document 1, which is a transparent sheet mounted on a front face of a display device and on which marks capable of providing a position information for showing the positions of input lines by an electronic pen for input and the like are printed by using an ink emitting light capable of being read by the above input line read means by irradiating with light having a prescribed wavelength.

Further, a coordinate input device prepared by using a transparent member on which a specific ink reflecting light in an infrared region is printed is disclosed in a patent document 2.

However, it is the existing situation that the examples of the specific transparent sheets are not shown in the patent documents 1 and 2 and that only an idea or a desire of the transparent sheets is described therein.

Accordingly, the present inventors have used a cross-linked and fixed cholesteric liquid crystal as a print ink for lattice points for inputting a coordinate to set a selective reflection wavelength of the above cholesteric liquid crystal layer to an infrared region, whereby they have invented a coordinate input sheet which is transparent to a visible light and in which lines drawn by a pen can be input by an infrared ray, and patents thereof have been applied (Japanese Patent Application No. 150121/2006 and Japanese Patent Application No. 269220/2006). However, further intensive investigations repeated by the present inventors have resulted in finding a new problem; in general, an orientation layer for orienting a liquid crystal is present in a lower layer of a cholesteric liquid crystal layer, and the orientation layer is subjected to orientational treatment such as rubbing treatment, whereby the cholesteric liquid crystal is oriented in a line while drawing fine spirals so that a helical axis is vertical to a plane surface of a substrate; in this regard, if the helical axis stays in a line vertically all over the plain surface of the substrate (that is, the respective film surfaces of a multilayer film structure are parallel plain surface groups), such a kind of a pen as used for reading can detect only a retroreflective component, and therefore only the component in a 0° (vertical) direction is read; and thus, it has been found that if the input pen inclines a little, a sensitivity of detection is dramatically reduced.

Accordingly, a read angle is required to be expanded in order to enhance a precision of detecting and reading a coordinate point.

On the other hand, a reflection type color filter structure for a liquid crystal display device which reproduces colors by reflection is disclosed in, for example, a patent document 3 as a conventional technique regarding a cholesteric liquid crystal pattern which reflects a non-visible light. In the above case, a reflection type filter structure comprising a first region reflecting a red light toward a vertical direction and further a second region reflecting an infrared ray (non-visible light) toward a vertical direction is disclosed as means for enhancing only a reflectance of a red light in an oblique direction without enhancing a reflectance of a red light in a vertical direction more than necessary in a red light reflection color filter. In the structure described above, the above second region is not increased in a reflectance of a red light in a vertical direction by reflecting an infrared ray toward a vertical direction. In addition thereto, a selective reflection wavelength of light incident to an oblique direction is shortened (refer to an equation described later), and therefore a red light in an obliquely incident light is reflected. Thus, the pertinent object is achieved. Further, diffraction gratings, circularly polarized plates, optical filters, colored decoration materials and the like each prepared by using a liquid crystalline film in which a cholesteric liquid crystal layer or a chiral smectic C liquid crystal layer is formed on a whole surface are disclosed in patent documents 4 and 5. In the above case, it is disclosed that in the multilayer membrane structure of the above cholesteric liquid crystal layer, curving or folding the above membrane from a parallel plane face provides the effects of reducing a dependency of a viewing angle in coloring and imparting a polarizing property to a diffraction light and that reducing specular reflection of an outside light provides the effect of reducing a viewing angle dependency.

In all the above cases, however, neither uses for coordinate input are desired nor it is indicated therein to form a cholesteric liquid crystal layer in a pattern shape in the uses for coordinate input.

Patent document 1: Japanese Patent Application Laid-Open No. 256137/2003
Patent document 2: Japanese Patent Application Laid-Open No. 243006/2001
Patent document 3: Japanese Patent Application Laid-Open (through PCT) No. 519728/2004
Patent document 4: International Patent Publication WO99/034242 pamphlet
Patent document 5: Japanese Patent Application Laid-Open No. 154865/2006

SUMMARY OF THE INVENTION

The present invention has been made in order to solve the problems described above, and an object of the present invention is to provide a non-visible light reflective pattern-printed transparent sheet having a broad read angle.

Intensive researches repeated by the present inventors in order to achieve the object described above have resulted in achieving the object described above by forming a non-visible light-reflective transparent pattern printed on the surface of a transparent substrate in the form a multilayer membrane structure comprising a fixed repeating cycle and having a curved part.

That is, the present invention provides a pattern-printed transparent sheet in which a transparent substrate comprises a base material and a primer layer, and a non-visible light reflective transparent pattern is printed on the surface of the primer layer; an ink constituting the transparent pattern described above contains a material having a wavelength selective reflectivity to a wavelength in an infrared or ultraviolet region; the primer layer described above consists of a primer composition repelling the ink described above; and when a cross section obtained by cutting the transparent pattern described above in a face orthogonal to the above transparent substrate is observed under a scanning electron microscope, the transparent pattern described above comprises a multilayer structure comprising a fixed repeating cycle and having a curved part and reflect selectively either of a left circularly polarized light component and a right circularly polarized light component in an incident light.

According to the present invention, a non-visible light reflective pattern-printed transparent sheet having a broad read angle can be provided.

BRIEF DESCRIPTION OF THE DRAWINGS

FIG. 2 is a cross-sectional photograph (FIG. 2-a) of a dot form of a transparent pattern which is one embodiment of the pattern-printed transparent sheet of the present invention and scanning electron micrographs (FIG. 2-b to d) showing the repetitive layer structures of a cholesteric liquid crystal in the partial cross sections thereof.

EXPLANATIONS OF THE CODES

Figure 1:
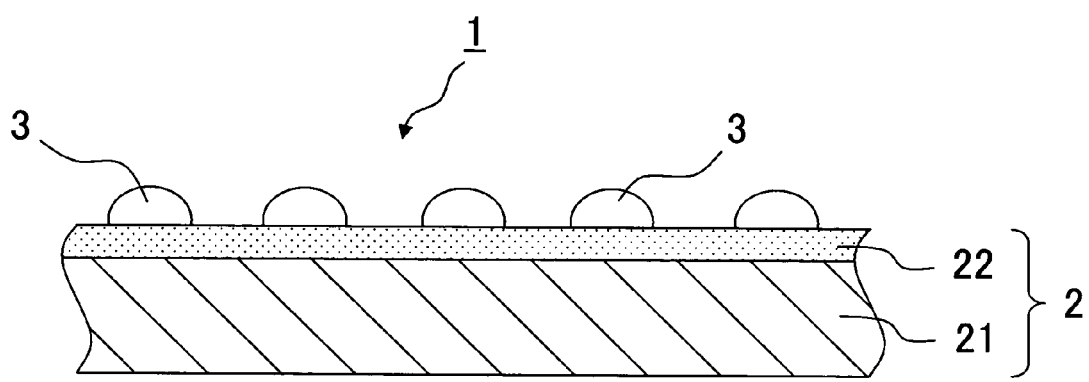
FIG. 1 is a cross section showing one embodiment of the pattern-printed transparent sheet of the present invention.

1: Pattern-printed transparent sheet (transparent sheet)
2: Transparent substrate
21: Base material
22: Primer layer
3: Transparent pattern
5: Display device
6: Input terminal (pen type)
7: Read data processing device
8: Electric wire or electric cable
i: Infrared ray or UV ray
r: Reflected light

BEST MODE FOR CARRYING OUT THE INVENTION

The present invention is a pattern-printed transparent sheet in which a transparent substrate comprises a base material and a primer layer and in which a non-visible light reflective transparent pattern is printed on the surface of the primer layer.

An ink constituting the transparent pattern contains a material having a wavelength selective reflectivity to a wavelength in an infrared or ultraviolet region, and the primer layer described above consists of a primer composition repelling the ink described above. In this regard, the term [wavelength selective reflectivity] means the characteristic that a ray (electromagnetic wave) of a specific wavelength area (wavelength range) is reflected at a particularly high reflectivity as compared with rays of other wavelength areas (reflected at a high reflectivity having a difference of such an extent as distinguishable at a satisfactory S/N ratio as compared with the rays of the other wavelength areas).

Further, the present invention is characterized by that when a cross section obtained by cutting the transparent pattern described above in a face orthogonal to the above transparent substrate is observed under a scanning electron microscope, the transparent pattern described above comprises a multilayer structure comprising a fixed repeating cycle and having a curved part and reflect selectively one of a left circularly polarized light component and a right circularly polarized light component in an incident light, that is, the transparent pattern has a circularly polarized light selection reflectivity. In this regard, the term [circularly polarized light selection reflectivity] means the characteristic that either ray (electromagnetic wave) of left and right circularly polarized lights is reflected at a particularly high reflectivity as compared with the rays of the other circularly polarized lights (reflected at a high reflectivity having a difference of such an extent as distinguishable at a satisfactory S/N ratio as compared with the rays of the other wavelength areas).

In this respect, a size and a thickness of the transparent pattern shall not specifically be restricted, and a form of the transparent pattern is variously selected according to the use purposes of the transparent sheet and shall not specifically be restricted, and it is preferably a dot form.

An example which is a typical embodiment of the present invention and in which the non-visible light reflective transparent pattern has a dot form provided by dot printing shall be explained. FIG. 1 is a cross section showing one embodiment of the pattern-printed transparent sheet of the present invention.

As shown in FIG. 1, in the pattern-printed transparent sheet 1 of the present invention (hereinafter referred to merely as the transparent sheet 1), a primer layer 22 is laminated on the surface of a base material 21 to constitute a transparent substrate 2, and a non-visible light reflective transparent pattern 3 (hereinafter referred to merely as the transparent pattern 3) is formed on the surface of the primer layer 22 in the form of a dot pattern by dot printing. In this regard, the primer layer 22 repels the respective droplets of the transparent pattern 3 in dot printing. These droplets which are repelled result in being raised and curved to a large extent. The above curvatures are fixed by drying and cross-linking of the droplets, and the transparent patterns 3 are arranged at a prescribed interval and result in comprising a multilayer structure (referred as well to as a multilayer membrane structure and hereinafter used properly case by case) having a curved part.

The transparent pattern 3 used in the present invention is characterized by reflecting selectively either of a left circularly polarized light component and a right circularly polarized light component in an incident light. In particular, assuming that a cholesteric liquid crystal material is used as the material described above having a wavelength selective reflectivity and that the multilayer structure of the transparent pattern is formed so that it has a fixed cholesteric structure, a desired circularly polarized light component (circularly polarized light component in which an electric field vector rotates to the same direction as a rotating direction of a helical axis of the above cholesteric liquid crystal) in an incident light can selectively be reflected by selecting a levorotatory or dextrorotatory cholesteric liquid crystal material, and therefore it is preferred.

In general, the term [liquid crystal] refers to a liquid crystal staying in a state showing a fluidity in a narrow sense, but in the specification of the present invention, a liquid crystal material having a fluidity which is solidified by means such as cross-linking, cooling and the like to be turned into a non-fluid state in the state that desired performances such as optical characteristics, a refractive index, an anisotropy and the like each owned by liquid crystals are maintained shall be called as well [liquid crystal].

FIG. 2 is a cross-sectional (cross section obtained by cutting the transparent pattern in a face orthogonal to the transparent substrate) photograph (FIG. 2-a) of a dot form of the transparent pattern 3 corresponding to one embodiment of the transparent sheet 1 of the present invention and scanning electron micrographs (FIG. 2-b to d) showing the repetitive layer structures of a cholesteric liquid crystal in the partial cross sections thereof.

FIG. 2-a shows that the dot form of the transparent pattern 3 is arched due to the primer layer 22 repelling the ink constituting the transparent pattern and becomes discoid or elliptical semi-spherical. FIG. 2-b is a partial cross-sectional photograph of a peak part of the dot form in FIG. 2-a, and FIG. 2-c and FIG. 2-d each are partial cross-sectional photographs of a left side incline part and a right side incline part of the dot form in FIG. 2-a. As shown above, curved parts are formed in the multilayer membrane of the cholesteric structure, that is, a parallel face group on the whole part of the dot form due to the dot form having a long incline part, and the broad read angle can be materialized in a principle described later in cooperation with microscopic curvatures found in the photographs of FIG. 2-b to d.

As described above, the curved part in the present invention includes not only a curved part originating in an outline form of each transparent pattern 3 but also a microscopic curved part in each transparent pattern 3.

Figure 3:
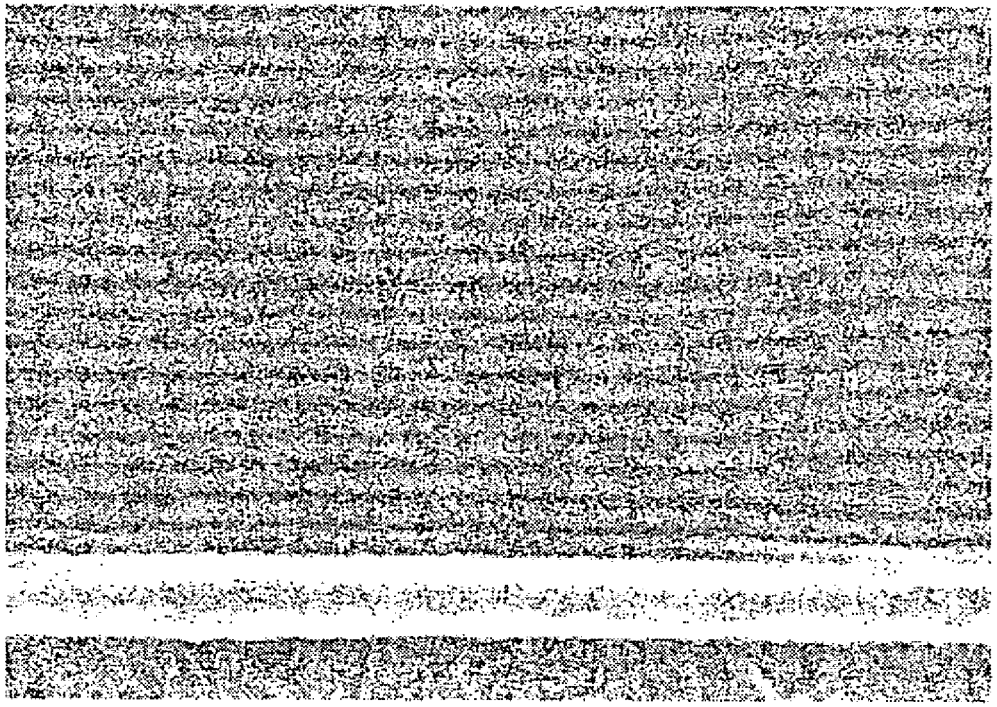
FIG. 3 is a scanning electron micrograph showing a repetitive layer structure of a cholesteric liquid crystal in a comparative example.

On the other hand, in a scanning electron micrograph showing a repetitive layer structure of a cholesteric liquid crystal in a comparative example shown in FIG. 3, a multilayer structure is flat (comprising an almost parallel plain face group), and a reflection angle observed in injecting a ray having a certain incident angle shows a fixed value all over the surface of the above multilayer, so that the read angle range is narrowed.

The form of the curved part in the above multilayer membrane structure may be, in addition to a curved face (curved line in a corresponding cut face) as shown in FIG. 2, a crossed and connected, inflected flat face (polygonal line in a corresponding cut face) or combination of a curved face and an inflected flat face in each membrane face (or a line corresponding to a cut face of the above membrane face) constituting a parallel face group. In a case where each membrane face is a curved face, each membrane face may be a discontinuous curved face (discontinuous curved line in a corresponding cut face) containing faults, acicular points and the like in addition to a continuous curved face (continuous curved line in a corresponding cut face). Also, in a case where each membrane face is a curved face, each membrane face may be either of a curved face group (curved line group which is convex in one direction in a corresponding cut face) which is always convex in one direction such as a hemispheric face and a folded curved face group (sinusoidal corrugated curved line group in a corresponding cut face) in which a concave face and a convex face are repeated one after the other. A degree of a distribution in tangential angles of the membrane faces in the curvatures of the respective membrane faces is suitably set according to uses and required designs, and it is usually about 10 to 30°.

In the liquid crystal having the cholesteric (chiral nematic) structure described above, an axis of each liquid crystal molecule is present in each layer face of the multilayer structure, and it is oriented uniformly along a specific direction in the above layer face. In addition thereto, an orientation direction of the above liquid crystal molecule axis is changed in order as a function of a layer thickness direction, and it is rotated in order as it proceeds to a thickness direction of the above cholesteric structure. As a result thereof, the rotation axis is turned to a thickness direction of the above multilayer membrane, and it has a helical structure (cholesteric structure) of a certain cycle which is rotated to a specific direction in a layer face of the above multilayer membrane. The characteristic of the cholesteric structure includes the properties (selective reflectivity) that it is a circularly polarized light component in which a rotation direction of the above spiral coincides with a rotation direction of the electric field and that it reflects a circularly polarized light of a wavelength corresponding to the helical pitch. In general, a selective reflection wavelength λ (nm) is given by the following equation:

$$\lambda = p \cdot n \cdot \cos\theta$$

p: helical pitch (nm) of cholesteric liquid crystal
n: average refractive index of liquid crystal
θ: incident angle of light (angle measured from a normal line on the surface)

One pitch of a cholesteric structure is a length of a helical axis direction required for rotation of a long and narrow liquid crystal molecule by 360° while drawing a spiral as proceeding along a layer thickness direction (means a helical axis and different from a liquid crystal molecule axis), and actual observation of a cross section obtained by cutting the transparent pattern in a face orthogonal to the transparent substrate reveals a repetitive layer structure in a layer thickness direction since an orientation direction of the liquid crystal molecule axis in the above layer face is the same direction in every rotation of the liquid crystal molecule axis by 180 (refer to FIGS. 2 to 3). Accordingly, an apparent interlayer pitch found in observing the cross section is ½ of a helical pitch of the liquid crystal. Consequently, if an apparent interlayer pitch found in observing the cross section is 250 nm, a pitch of the liquid crystal is 500 nm.

When a circularly polarized light is injected, reversed is a rotational direction in a circularly polarized light component of light reflected on the surface of a transparent substrate comprising a conventional material such as a resin, glass and the like. On the other hand, a rotational direction in a circularly polarized light component of light reflected on the surface of a cholesteric liquid crystal remains as it is and is unchanged. Accordingly, making use of the above property makes it possible to improve an SN ratio of light reflected from the non-visible light reflective transparent pattern 3 to a background light (light reflected from other parts than the pattern part) by combining with a circular polarization filter.

In the case of reflection by the cholesteric structure, usually the larger the print thickness (film thickness) is, the larger the reflection intensity is. If the thickness is too large, however, an unnecessary disturbance in an orientation of the liquid crystal, a reduction in the transparency and an increase in the dry load are brought about, and therefore a print thickness of the transparent pattern 3 is usually 1 to 20 µm, preferably 3 to 15 µm. It is assumed that when a helical pitch number of a cholesteric liquid crystal structure is approximately 10 to 20 pitches, the reflectance reaches a saturated state. In the actual production, however, if a liquid crystal composition and solidification conditions are determined, a film thickness at which a reflection intensity is saturated can be experimentally determined, and the reflectance is suitably optimized. The film thickness (or the pitch number) which is not smaller than the thickness described above is good only from the viewpoint of the reflectance, but if the film thickness is larger than necessary, the printed patterns are liable to be abraded and damaged, and the production cost grows higher than necessary, so that the film thickness is preferably controlled to a minimum necessary film thickness.

The liquid crystal material developing a cholesteric structure which is preferably used for the transparent sheet 1 of the present invention shall be explained below. In the present invention, a wavelength of a non-visible light shall not specifically be restricted. It is important that a reflected light in the above transparent pattern is colored and visible and that it is not highly visible, and an infrared ray or a UV ray is usually used. Usually, light in a near infrared region of particularly 800 to 2600 nm is preferably used in an infrared ray, and usually light in a near UV region of particularly 200 to 380 nm is preferably used in a UV ray.

In the following, explanations shall be given with a focus put on a near infrared region of 800 to 2600 nm and a near UV region of 200 to 380 nm. In this regard, a visible light resides in a visible wavelength region and falls in a range of 380 to 780 nm. The term "transparent" means that the transmittance in the above visible light region is high, to be specific, the transmittance in the above visible light region is about 50% or more, preferably 70% or more.

The non-visible light reflection material constituting the transparent pattern 3 used in the present invention is, as described above, preferably a liquid crystal material showing a cholesteric liquid crystal phase having a cholesteric regularity, and polymerizable chiral nematic liquid crystal materials (polymerizable monomer or polymerizable oligomer) prepared by mixing polymerizable nematic liquid crystals with a polymerizable chiral agent or high molecular cholesteric liquid crystal materials can be used. The above polymerizable chiral nematic liquid crystal materials are subjected to cross-linking reaction and the like by publicly known methods such as irradiation with an ionizing radiation including a UV ray, an electron beam and the like or heating, and they are polymerized and solidified (cured).

In the present invention, among the polymerizable chiral nematic liquid crystal materials described above, the cross-linkable polymerizable monomers or polymerizable oligomers having cross-linking functional groups in molecules are preferably used, and they have more preferably an acrylate structure as the polymerizable functional group.

In the case of the liquid crystal materials assuming (developing) the cholesteric structure described above, a high transmittance is not necessarily required in a wavelength of a visible ray region under normal circumstances as long as they have a high reflectance (usually about 5 to 50% in a non-polarized light) in at least a part of a wavelength of a non-visible light region (an infrared ray or a UV ray). This is because assuming that the polymerizable liquid crystal materials having the cholesteric structure described above are completely opaque, the desired transparency can be obtained in the whole part of the transparent pattern 3 concerned if an area of a non-forming part (margin part) in the above liquid crystal materials is taken to a suitably large extent to make use of light transmitting through the above part. However, it is a matter of course that a higher visible light transmittance of the above liquid crystal materials is more preferred. Usually, if a high reflection wavelength area of the above polymerizable liquid crystal materials assuming a pertinent cholesteric structure is set to an infrared region or a ultraviolet region, a thickness of about several µm provides a visible light transmittance of about 70% or more in a visible ray region. On the other hand, a high reflectance of about 5 to 50% is usually obtained in a non-visible light region in the case of a non-polarized light. Also, a temperature range in which the polymerizable liquid crystal materials described above have a cholesteric structure shall not specifically be restricted, and it can preferably be fixed in the state of a cholesteric phase by cross-linking. The materials in which a temperature allowing the cholesteric phase to be shown falls in a range of 30 to 140° C. are preferred since a drying step in printing the patterns and a phase transition of the liquid crystal can be carried out at the same time.

Such materials as described above can be optically fixed while allowing liquid crystal molecules to remain in a state of a cholesteric liquid crystal, and the patterns which are easily handled for the transparent sheet 1 and which are stable at ambient temperature can be formed.

Further, capable of being used as well are liquid crystal polymers (high molecular cholesteric liquid crystals) which have a high glass transition temperature and which can be solidified in a glass state at ambient temperature by cooing after heating. The above materials can be optically fixed in the same manner while allowing liquid crystal molecules to remain in a state of a liquid crystal having a cholesteric regularity, and patterns which are easily handled for an optical sheet and which are stable at ambient temperature can be formed.

Mixtures of liquid crystalline monomers and chiral compounds disclosed in Japanese Patent Application Laid-Open No. 258638/1995, Japanese Patent Application Laid-Open (through PCT) No. 513019/1999, Japanese Patent Application Laid-Open (through PCT) No. 506088/1997 and Japanese Patent Application Laid-Open (through PCT) No. 508882/1998 can be used as the cross-linkable polymerizable monomers described above. For example, a chiral nematic liquid crystal (cholesteric liquid crystal) is obtained by adding a chiral agent to a liquid crystalline monomer showing a nematic liquid crystal phase. In this case, the nematic liquid crystal and the chiral agent each have preferably cross-linkable functional groups, and the cholesteric structure is preferably fixed by cross-linking the above functional groups.

Processes for producing films of cholesteric liquid crystals are described as well in Japanese Patent Application Laid-Open No. 5684/2001 and Japanese Patent Application Laid-Open No. 110045/2001.

The nematic liquid crystal molecules (liquid crystalline monomers) which can be used in the present invention include, for example, compounds represented by Formulas (1) to (11) shown below. The compounds shown below as examples have an acrylate structure and can be polymerized by irradiating with a UV ray and the like.

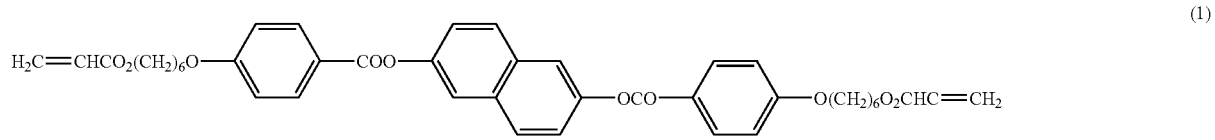

(1)

(2)

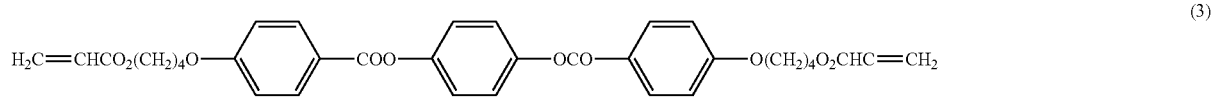

(3)

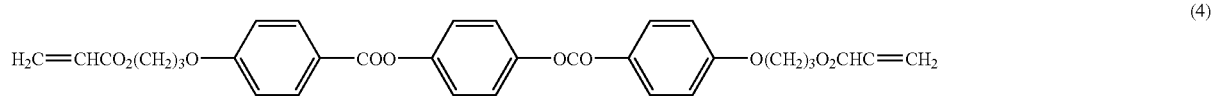

(4)

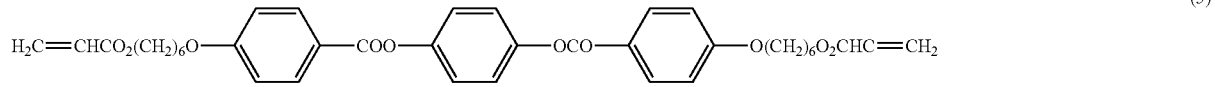

(5)

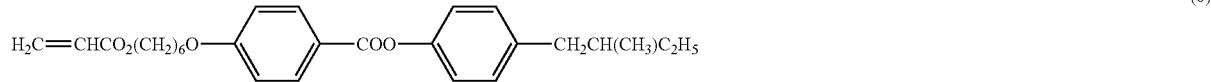

(6)

(7)

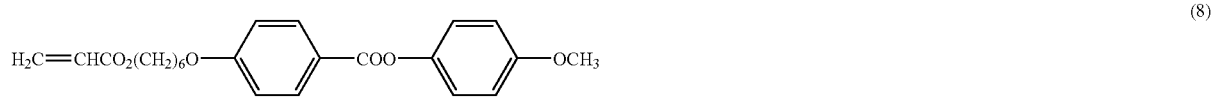

(8)

(9)

(10)

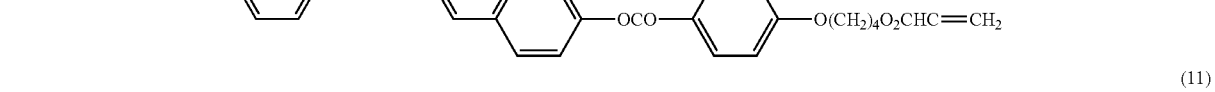

(11)

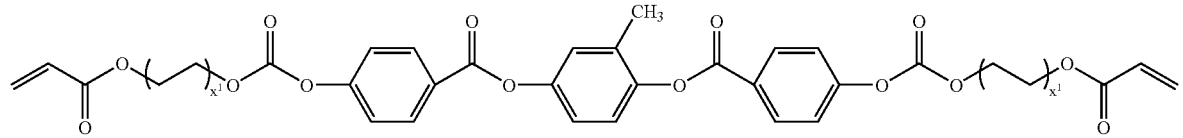

In Compound (II), $X^1$ is 2 to 5 (integer).

Also, cyclic organopolysiloxane compounds having a cholesteric phase disclosed in Japanese Patent Application Laid-Open No. 165480/1982 can be used as the cross-linkable polymerizable oligomers described above.

Further, high polymers which have a liquid crystal and in which a mesogen group is introduced into a position of a principal chain or a side chain or both positions of the principal chain and the side chain, high molecular cholesteric liquid crystals in which a cholesteryl group is introduced into a side chain, liquid crystalline high polymers disclosed in Japanese Patent Application Laid-Open No. 133810/1997 and contained in the patterns, and when the nematic liquid crystal and the chiral agent are used as the liquid crystal material, the pitch length can be controlled by controlling an addition amount of the chiral agent. An addition amount of the chiral agent for obtaining the selective reflection peak wavelength in the targeted infrared region or ultraviolet region is varied depending on the kinds of the liquid crystal used and the chiral agent. When using, for example, the liquid crystal represented by Formula (II) and the chiral agent represented by Formula (12), a cholesteric phase having a reflection peak in an infrared region is formed by adding about 3 parts by mass of the chiral agent based on 100 parts by mass of the liquid crystal, and a cholesteric phase having a reflection peak in a ultraviolet region is formed by adding about 9 parts by mass of the chiral agent based on 100 parts by mass of the liquid crystal. When a high molecular cholesteric liquid crystal is used for the liquid crystal material, a polymer material having the targeted pitch length is suitably selected.

The polymer of the nematic liquid crystal molecules and the chiral agent in the present invention can be obtained, for example, by adding a publicly known photopolymerization initiator and the like to a polymerizable nematic liquid crystal and a polymerizable chiral agent and irradiating the mixture with a UV ray to radically polymerize it.

The photopolymerization initiator includes photopolymerization initiators of a bisacylphosphine oxide base, an α-aminoketone bas and the like. The specific examples of the photopolymerization initiators of a bisacylphosphine oxide base include diphenyl-(2,4,6-trimethylbenzoyl)phosphine oxide, bis(2,4,6-trimethylbenzoyl)phenylphosphine oxide and the like. The specific example of the photopolymerization initiators of an α-aminoketone base includes 2-methyl-1-[4-(methylthio)phenyl]-2-morpholinopropane-1-one.

Also, when printing the transparent patterns 3 in the present invention, a coating liquid prepared by dissolving the polymerizable monomer or the polymerizable oligomer and the chiral agent in a solvent is preferably used.

The above solvent shall not specifically be restricted as long as it has a satisfactory solubility to the materials, and publicly known compounds are suitably used. It includes, for example, conventional solvents such as anone (cyclohexanone), cyclopentanone, toluene, acetone, MEK (methyl ethyl ketone), MIBK (methyl isobutyl ketone), DMF (N,N-dimethylformamide), DMA (N,N-dimethylacetamide), methyl acetate, ethyl acetate, n-butyl acetate, 3-methoxybutyl acetate and the like and mixed solvents thereof.

The base material 21 of the transparent substrate 2 used for the transparent sheet 1 of the present invention shall not specifically be restricted as long as it is a material transmitting a visible light, and it is preferably made of a material having less optical defects. So-called films, sheets or materials having a tabular form are suitably used. Further, it may be flat, and in addition thereto, it may have a curved surface form so that it fits a curved surface of a display. To be specific, glass, TAC (triacetyl cellulose), PET (polyethylene terephthalate), polycarbonate, polyvinyl chloride, acryl, polyolefin and the like are suitably used as the materials for the base material 21. The thickness thereof is selected from a range of 20 to 5000 µm, preferably 100 to 5000 µm from the viewpoint of the curl preventing property according to the materials, the required performances and the use forms.

When a material which is liable to be dissolved or swollen in a solvent, such as a high molecular film including a TAC film and the like is used as the base material 21 described above, a barrier layer may be provided on the base material 21 so that the substrate is not damaged by a solvent contained in the coating liquid used in printing the transparent patterns 3. For example, water-soluble materials such as PVA (polyvinyl alcohol), HEC (hydroxyethyl cellulose) and the like are suitably used for the barrier layer.

Materials having the property that they repel droplets of the ink constituting the transparent pattern are selected as the material used for the primer composition constituting the primer layer 22 of the transparent substrate 2 according to the present invention. Also, transparent resins composed of an organic resin and/or an inorganic resin are preferred particularly in terms of capable of forming a layer by coating. The resins used for the above primer composition shall not specifically be restricted and include, for example, thermoplastic resins, thermosetting resins, ionizing radiation-curing resins and the like. Among them, resins of a type in which curing is carried out by cross-linking are preferred from the viewpoint of obtaining a durability, a solvent resistance and a broad read angle, and the ionizing radiation-curing resins which can be cross-linked for short time by an ionizing radiation such as a ultraviolet (UV) ray, an electron beam and the like are more preferred. When the above resins do not have a satisfactory liquid repelling property to the ink for forming the transparent pattern, a liquid repelling leveling agent is further added.

The thermoplastic resins described above include, for example, acryl resins, polyester resins, thermoplastic urethane resins, vinyl acetate resins, cellulose base resins and the like, and when the material for the transparent substrate 2 is a cellulose base resin such as TAC (triacetyl cellulose) and the like, the thermoplastic resin is preferably the cellulose base resin such as nitrocellulose, acetyl cellulose, cellulose acetate propionate, ethyl hydroxyethyl cellulose and the like.

The thermosetting resins described above include, for example, phenol resins, urea resins, diallyl phthalate resins, melamine resins, guanamine resins, unsaturated polyester resins, urethane resins, epoxy resins, aminoalkyd resins, melamine-urea copolycondensation resins, silicon resins, polysiloxane resins, curable acryl resins and the like. When the thermosetting resin is used, a curing agent such as a cross-linking agent, a polymerization initiator and the like, a polymerization accelerating agent, a solvent, a viscosity controlling agent and the like can be further added and used if necessary.

The materials used for the primer composition described above are preferably the ionizing radiation-curing resins as described above, and various reactive monomers and/or reactive oligomers are suitably used. The reactive monomers include multifunctional (meth)acrylate monomers. The reactive oligomers include oligomers having a radically polymerizable unsaturated group in a molecule, for example, epoxy (meth)acrylates, urethane (meth)acrylates, polyester (meth)acrylates, polyether (meth)acrylates and the like. In this connection, (meth)acrylate means acrylate or methacrylate.

Examples of a polymerization initiator for the reactive monomers or the reactive oligomers include the photopolymerization initiators of the bisacylphosphine oxide base and the α-aminoketone base each described above.

Examples of the multifunctional (meth)acrylate monomers described above include ethylene glycol di(meth)acrylate, propylene glycol di(meth)acrylate, 1,4-butanediol di(meth)

acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate and the like.

The liquid repelling leveling agent used for the primer composition according to the present invention may be any compounds as long as they repel the ink forming the transparent pattern 3. Various compounds of a silicone base, a fluorine base, a polyether base, an acrylic acid copolymer base, a titanate base and the like can be used as the leveling agent. Particularly acrylic acid copolymer base leveling agents (for example, trade name "BYK361", manufactured by Bic Chemie AG.) are preferably used in order to repel the ink of the liquid crystal material forming a fixed cholesteric structure. An addition amount thereof is suitably controlled according to the desired read angle. When the resin itself selected as a material for the primer composition has already a satisfactory liquid repelling property to the ink for forming the transparent pattern, addition of the liquid repelling leveling agent can be omitted. The resins having a high liquid repelling property in itself include silicon resins, fluororesins and the like.

From the viewpoint of obtaining the broad read angle, the leveling agent (liquid repellent substance) described above is added to the primer layer 22, and in addition thereto, fine particles may be further added to form irregularities and folds on a Bragg reflection surface formed thereon having a cholesteric structure of liquid crystal.

Conventionally used substances can be added in a suitable amount as the fine particles without specific restrictions, and they include, for example, transparent particles of α-alumina, silica, kaolinite, glass, calcium carbonate, diamond, silicon carbide and the like in the case of inorganic particles. The form of the particles includes a sphere, a spheroid, a polyhedron, a truncated polyhedron, a scale and the like, and it shall not specifically be restricted but is preferably a sphere. The particles include synthetic resin beads of a cross-linked acryl resin, a polycarbonate resin and the like in the case of organic particles. Among them, α-alumina and silica are preferred from the standpoints that they have a high transparency and that spherical particles are liable to be obtained, and the spherical particles thereof are particularly preferred. The fine particles have a particle diameter of about 50 µm to about 5 mm. The surface of the transparent pattern 3 may be curved to a convex curved face (for example, a semispherical curved face), and fine irregularities may be provided on the surface of the transparent pattern by embossing.

Publicly known various additives in coating liquids and inks may suitably be added, if necessary, to the primer layer 22 as long as a non-visible light reflection function, a moiré preventing effect and a transparency of the transparent pattern 3 in the present invention are not damaged. The additives include, for example, light stabilizers such as UV absorbers, antistatic agents, heat stabilizers, lubricants, surfactants, dispersion stabilizers and the like.

The primer layer 22 can be formed by coating the ink of the primer composition obtained in the manner described above by a publicly known layer forming method such as a coating method, a printing method and the like. To be specific, it is suitably formed on the base material 21 by a coating method such as roll coating, comma coating, die coating and the like or a printing method such as screen printing, gravure printing and the like.

A thickness of the primer layer 22 is usually 1 to 10 µm, and it is preferably 0.1 to 5 µm from the viewpoints that a thin film can be formed and that it is inexpensive.

In the pattern-printed transparent sheet 1 of the present invention, particularly an overcoat layer for covering the transparent pattern 3 may be provided on the transparent substrate 2 in order to provide the transparent sheet with a strength which can stand repetitive contact given by an input terminal of a pen type when inputting by handwriting by means of the input terminal. A material of the overcoat layer shall not specifically be restricted, and materials used in the fields of conventional transparent sheets and lenses can be used. Among them, materials having a refractive index which is close to those of the transparent pattern 3 can preferably be used in order to reduce moiré. Examples of the representative materials are acryl resins, silicone base resins and the like which are cross-linked and cured by a UV ray, an electron beam, heat and the like.

In the transparent sheet of the present invention, a printing method for the transparent pattern 3 shall not specifically be restricted, and publicly known methods can be used and include, for example, a flexographic printing method, a gravure printing method, a stencil printing method, an ink jet printing method and the like.

The transparent pattern 3 obtained in the manner described above has preferably a selective reflection peak wavelength in 800 to 950 nm or 200 to 400 nm.

In transparent sheet 1 of the present invention, the transparent patterns 3 are such patterns that reflected patterns of a non-visible light are read by an input terminal capable of irradiation and detection of a non-visible light and that the position information (position coordinates) of the input terminal on the transparent sheet can be provided, and they are set so that the position information of the input terminal on the sheet face can be derived from the partial patterns read by the input terminal equipped with a sensor.

Figure 4:
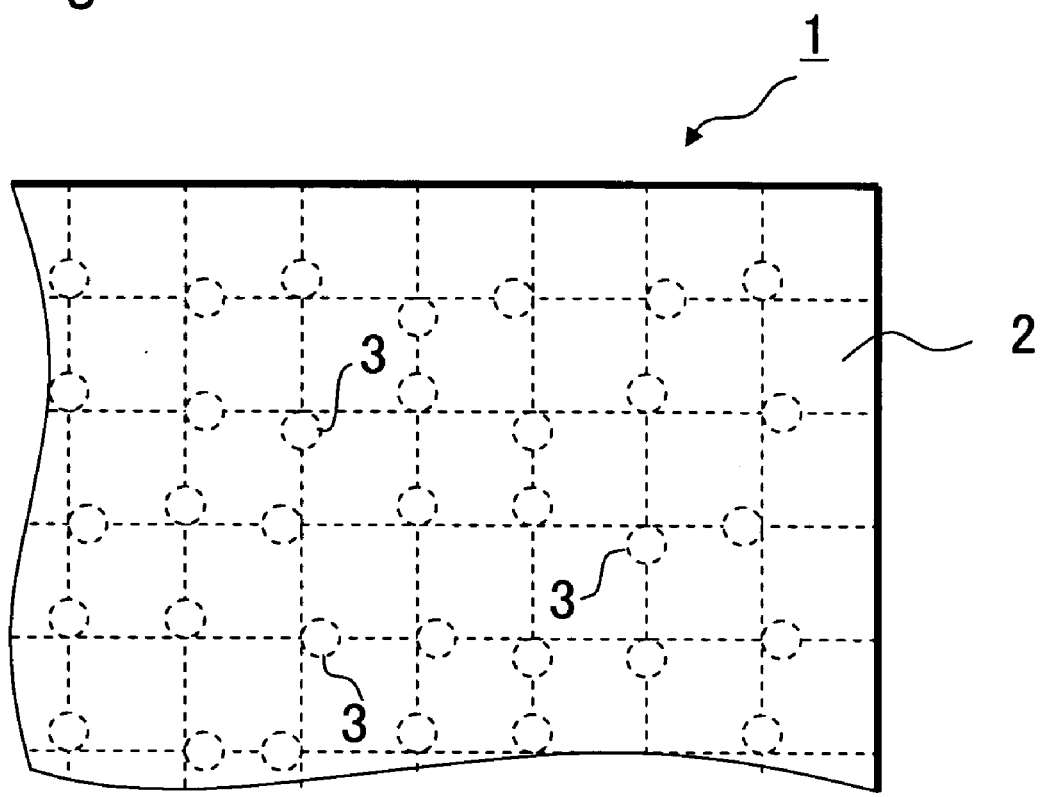
FIG. 4 is an enlarged plain drawing of a substantial part showing an example in which dot patterns are irregularly arranged in the pattern-printed transparent sheet of the present invention.

FIG. 4 is an enlarged plain drawing of a substantial part showing an example in which dot patterns are irregularly arranged in the transparent sheet 1 of the present invention. The example of FIG. 4 is a method in which standard points arranged vertically and horizontally at equal intervals are set and in which dots displaced right and left, up and down based on the above standard points are disposed to make use of a relative positional relation from the above standard points, and it is suitably given as a method by which the dot patterns are particularly simply produced. The above method is advantageous for raising a resolution of the input device since a size of the dots can be reduced and fixed.

In addition thereto, the dot patterns include patterns obtained by setting plural forms of dots and patternizing combinations of the dots of these plural forms arranged in a prescribed range in a plain face, patterns obtained by changing thicknesses of ruled lines arranged vertically and horizontally and patternizing combinations of the sizes of the overlapped parts of the ruled lines described above in a prescribed range and patterns obtained by combining the values of x, y coordinates directly with the vertical and horizontal sizes of dots.

In the transparent pattern 3 according to the present invention, the print thickness (film thickness) can suitably be increased when they are formed by dot printing in which the combinations of the dots are patternized.

In the transparent sheet 1 of the present invention, a larger non-visible light reflectance in a selective reflection peak wavelength is preferred in order to detect reflected patterns by means of an infrared sensor or a ultraviolet sensor installed in the input device. The reflectance in a selective reflection peak wavelength is usually about 5% or more, preferably 20% or more. Reflection by a cholesteric structure has a property to reflect selectively a circularly polarized light having the same direction as that of a cholesteric spiral, and therefore the reflectance reaches only about 50% at a maximum in injecting a non-polarized light (containing an equal amount of both left and right polarized light components). Accordingly, when light containing only a circularly polarized light having the same direction as that of a helical direction of the cholesteric structure is injected from the beginning, a reflectance of 100% can be achieved in theory (assuming that a loss caused by absorption, scattering and the like is ignored).

When the printed patterns are dot patterns, the dot forms shall not specifically be restricted as long as the dots can readily be distinguished from the adjacent dots, and the forms in which plane-viewing forms are circular, elliptic and polygonal such as triangle, quadrangle, pentagon, hexagon, octagon and the like (including equilateral or inequilateral forms) are usually used. The plane-viewing dimension of the respective dots may suitably be determined according to the uses and shall not specifically be restricted, and usually it is about 1 to 200 μm in terms of a crossing distance (evaluated by a diameter in a case of a circle, an average value of a short radius and a long radius in a case of an ellipsoid and an average length of a diagonal line or a diameter of a circumcircle in a case of a polygon). The dots having the same form and the same dimension over the whole face may be used for the above dots, or two or more kinds of the dots which are different in either of a form and a dimension or both of them may be used in a mixture. The steric form of the dots is preferably a discoid form or an elliptic semispherical form which is raised upward. A dimension of the dots in a thickness direction corresponds to the print thickness described above.

Figure 5:
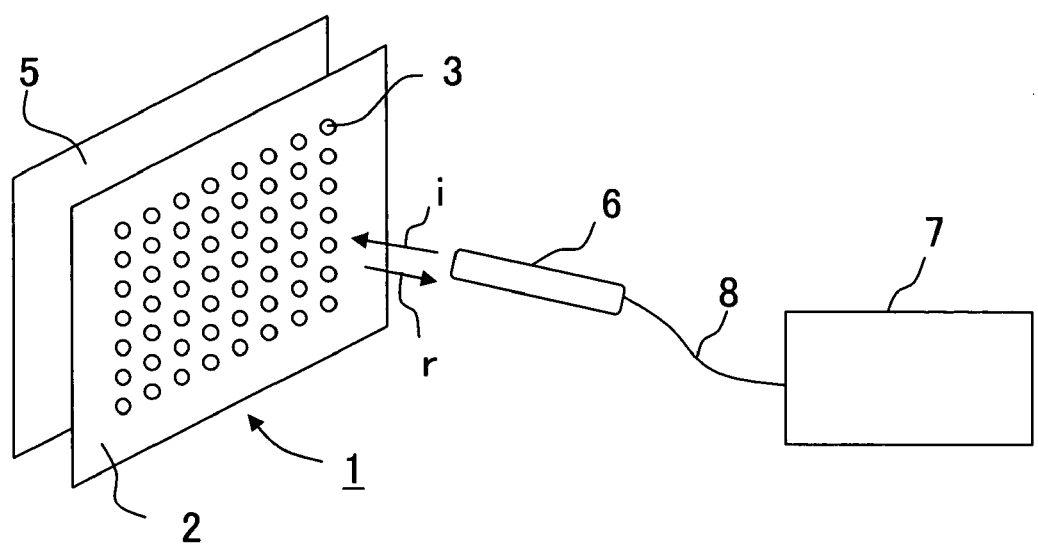
FIG. 5 is a schematic drawing of a whole part in a system using the pattern-printed transparent sheet of the present invention.

FIG. 5 is a schematic drawing of a whole system using the transparent sheet 1 of the present invention.

In the present invention, the transparent pattern makes it possible to read a reflected pattern of an infrared ray or a UV ray by means of an input terminal 6 capable of irradiation and detection of an infrared ray or a UV ray to provide position information of the input terminal 6 on the transparent sheet 1. Accordingly, the input terminal 6 which can be used shall not specifically be restricted as long as it can emits, as shown in FIG. 5, an infrared ray or a UV ray i and detect a reflected ray r of the pattern described above, and publicly known sensors are suitably used. An example in which the input terminal 6 of a pen type is equipped as well with a read data processing device 7 includes an input terminal disclosed in Japanese Patent Application Laid-Open No. 256137/2003, in which built-in are a pen tip provided with no ink and no graphite, a CMOS camera equipped with an infrared or ultraviolet irradiation part, a processor, a memory, a communication interface such as a wireless transceiver and the like making use of a Bluetooth technique, a battery and the like.

To explain the action of the pen type input terminal 6, the pen tip is brought into contact with a front surface of the transparent sheet 1 on which the dot patterns having plane view shown in FIG. 4 are printed and draws lines so that the pen tip traces the front surface, and the pen type input terminal 6 detects a pen pressure applied onto the pen tip to operate the CMOS camera; a prescribed range in the vicinity of the pen tip is irradiated with an infrared ray or a UV ray of a prescribed wavelength emitted from the infrared or ultraviolet irradiation part, and the patterns are imaged (the patterns are imaged several 10 to about 100 times per second). When the pen type input terminal 6 is equipped with a read data processing device 7, input lines formed by movement of the pen tip in handwriting are digitized and turned into data by analyzing the imaged patterns by means of the processor to prepare an input line data, and the input line data is sent to the information processing device.

The members such as the processor, the memory, the communication interface such as a wireless transceiver and the like making use of a Bluetooth technique, the battery and the like may be present, as shown in FIG. 5, as the read data processing device 7 at an outside of the pen type input terminal 6. In this case, the pen type input terminal 6 may be connected to the read data processing device 7 via an electric wire or electric cable 8 or may send read data by wireless using an electric wave, an infrared ray, a UV ray or the like.

In addition thereto, the input terminal 6 may be a reader described in Japanese Patent Application Laid-Open No. 243006/2001.

A display device 5 in which the transparent sheet 1 of the present invention is installed may be connected to an information processing device for processing handwritten input data or may be independent, and the former is preferred since it can show lines input by handwriting on a screen and enables to intuitively input the lines.

In this regard, the examples which can be shown as the information processing device handling handwritten informations include portable phones, various mobile terminals such as PDA and the like, personal computers, TV phones, TV endowed with an intercommunication function, internet terminals and the like.

Further, a reflection preventing film and the like for preventing reflection of a visible light may be provided on the surface of the sheet or in the inside thereof in order to secure a visibility of the display device 5 present on the back of the transparent sheet 1 of the present invention. A material of the reflection preventing film shall not specifically be restricted, and materials used in the fields of conventional transparent sheets for displays and lenses can be used. Examples of the representative materials are dielectric multilayer films prepared by laminating a thin film of a substance having a low refractive index such as magnesium fluoride, a fluorine base resin and the like and a thin film of a substance having a high refractive index such as zirconium oxide, titanium oxide and the like so that the above thin film having a low refractive index is provided on the outermost surface. It is a matter of course that the above reflection preventing film has to be provided so that an infrared ray or a UV ray for detecting the position information which is reflected from the transparent pattern is not prevented from being reflected (the material thereof is selected or the reflection preventing film is provided so that the transparent pattern 3 are not covered therewith).

The read data processing device 7 which can be applied in the present invention shall not specifically be restricted as long as it has a function to calculate a position information from a continuous imaged data read by the input terminal 6 and combine it with a time information to provide it as an input line data which can be handled by the information processing device, and it is suitably equipped with the members such as the processor, the memory, the communication interface, the battery and the like.

The read data processing device 7 may be built in the input terminal 6 as is the case with Japanese Patent Application Laid-Open No. 256137/2003 or may be built in the information processing device equipped with the display device 5. The read data processing device 7 may send a position information to the information processing device equipped with the display device 5 by wireless or may send it by wire connected to the processing device via an electric wire or electric cable 8.

The read data processing device connected to the display device 5 can display lines input by handwriting by means of the input terminal 6 on the display device 5 in real time (or in suitably delayed time if necessary) as if written on a paper by a pen by renewing in order images shown on the display device 5 based on line informations sent from the read data processing device 7. To be a matter of course, it is optionally possible whether lines input by handwriting and displayed images are superposed and displayed or they are displayed separately.

The pattern-printed transparent sheet 1 of the present invention can detachably be installed oppositely to the front face of the display device 5. In this regard, the term "installed oppositely to the front face" is a concept including, for example, a case in which the transparent sheet 1 is disposed in direct contact with the surface of the display device 5, a case in which the transparent sheet 1 is adhered via a pressure-sensitive adhesive layer or an adhesive layer and a case in which the transparent sheet 1 is disposed in non-contact state on the front of the display device 5 via a space. The foregoing manner of installation thereof makes it possible to install the transparent sheet not only on one display device but also on another display device. Further, the transparent sheet 1 itself is preferably equipped with a means for installation thereof onto the display device 5 in order to make it possible to install the transparent sheet 1 without subjecting the display device to processing for installing the transparent sheet 1. The above installation means may be provided integrally with the transparent sheet 1 or may be provided separately therefrom.

The above installation means includes buckle-shaped means which are hooked at the corner parts of the display device 5 and means which pinch the end parts of the display device 5, and when installed oppositely to the front face of the display device 5, the specific embodiment thereof which is simple and suitable includes an adhering instrument which is provided at a contact face side brought into contact with the display device 5 and which has an adhesive property or a sticky property for adhering the instrument onto the display device 5. Further, the adhering instrument includes instruments which are mounted integrally to the transparent sheet 1 and which have an adhesive property or a sticky property and instruments containing an adhesive or a pressure-sensitive adhesive which is coated directly the a contact face.

The pattern-printed transparent sheet 1 of the present invention is preferably separable in order to enhance convenience in the production thereof. To be specific, it includes the sheets which can be separated by cutting tools such as scissors or dedicated cutting tools and the sheets which can be separated with hands by providing perforated lines or half cuts (means in which a cut line having such a depth that does not reach a whole depth is provided in a thickness direction; they are used in many cases in the field of packaging materials). Such sheets can be cut by users according to a size of display devices owned by the respective users, and therefore the makers suitably produce the sheets set to several kinds of prescribed sizes. Further, cut lines corresponding to the standard sizes of general purpose display devices may be provided.

If the ways of use described above are possible, one sheet on which patterns providing position information are printed can be divided so that the respective sheets show different coordinate ranges. When the above sheets are used, the sheet showing a continuous coordinate is applied to an adjacent display device, whereby input data can be provided with continuity. Further, plural transparent sheets having different coordinate ranges are used for one input device while switching the sheets over, whereby different meanings can be given to the respective transparent sheets.

The pattern-printed transparent sheet 1 of the present invention can detect informations at a broad read angle and therefore has been notably improved in an ability to detect printed position information.

In addition thereto, the transparent sheet 1 of the present invention can be installed as it is in an existing display device, and it can be prepared more readily than position input devices of an electrostatic type, a pressure-sensitive type and the like which are types built in a display device and readily makes it possible to reduce a weight, decrease a cost and increase a size. Further, even when the patterns which can provide the printed position information are thinned or scratched, so that a function of providing the position information is reduced, only the transparent sheet 1 can be exchanged, and therefore it is easy for users to handle.

The transparent sheet 1 of the present invention can also be used as a liquid crystal protect sheet by mounting on a liquid crystal display.

EXAMPLES

Next, the present invention shall be explained in further details with reference to examples, but the present invention shall not be restricted to the examples shown below.

Example 1

A monomer (having a molecular structure shown by the chemical formula (9) described above) 100 parts by mass which had a polymerizable acrylate group at an end and in which a nematic-isotropic transfer temperature was in the vicinity of 110° C., a chiral agent (having a molecular structure shown by the chemical formula (12) described above) 3.0 parts by mass, which had a polymerizable acrylate group at an end and a photopolymerization initiator diphenyl-(2,4,6-trimethylbenzoyl)phosphine oxide (trade name: Lucirin TPO, manufactured by BASF Japan Ltd.) 4 parts by mass were dissolved in MIBK (methyl isobutyl ketone) to prepare a solution, and this was used as a liquid crystal ink.

On the other hand, a solution prepared by dissolving 100 parts by mass of pentaerythritol triacrylate, 0.03 parts by mass of an acrylic acid copolymer base leveling agent (trade name: BYK361, manufactured by Bic Chemie AG.) and 4 parts by mass of a polymerization initiator (trade name: Lucirin TPO, manufactured by BASF Japan Ltd.) in MEK (methyl ethyl ketone) was coated on a whole surface of a PET film (thickness: 100 μm) by a gravure printing method and cured into a film by cross-linking reaction by irradiation with a UV ray to form a primer layer having a film thickness of 1 μm, whereby a transparent substrate was prepared.

The liquid crystal ink was coated on the above transparent substrate by the gravure printing method so that dot patterns were formed, and the dots were oriented so that they had a cholesteric structure. Then, the liquid crystal ink was cured by cross-linking reaction by irradiation with a UV ray to obtain a pattern-printed transparent sheet. In respect to a size of the dots, a diameter of the disc was about 100 µm, and a thickness of the dots was 8 µm. The transparent sheet obtained was measured for a reflectance of a rectangular pattern (solid coated part) for measuring a reflectance by means of a spectrophotometer (incident angle: 5°, manufactured by Shimadzu Corporation) to find that a selective reflection wavelength peak of the coating film was 850 nm and that the reflectance was 20%. Further, a cross section of the sample prepared was observed under a scanning type microscope to find that the cholesteric liquid crystal had a multilayer structure comprising a fixed repetitive cycle and that a curved part was formed, as shown in FIG. 2, along an elliptic semispherical disc of the dot, and it was read by means of a pen type sensor which reflected an infrared ray to detect a reflected ray thereof in the form of an image to find that it could be read in a range of about 0 to 45° measured from a normal direction on the surface of the above transparent sheet.

Example 2

A monomer (having a molecular structure shown by the chemical formula (9) described above) 100 parts by mass which had a polymerizable acrylate group at an end and in which a nematic-isotropic transfer temperature was in the vicinity of 110° C., the chiral agent (having a molecular structure shown by the chemical formula (12) described above) 9.0 parts by mass which had a polymerizable acrylate group at an end and the photopolymerization initiator diphenyl-(2,4,6-trimethylbenzoyl)phosphine oxide (trade name: Lucirin TPO, manufactured by BASF Japan Ltd.) 4 parts by mass were dissolved in MIBK to prepare a solution, and this was used as a liquid crystal ink.

On the other hand, a solution prepared by dissolving 100 parts by mass of pentaerythritol triacrylate, 0.03 parts by mass of the acrylic acid copolymer base leveling agent (trade name: BYK361, manufactured by Bic Chemie AG.) and 4 parts by mass of the polymerization initiator (trade name: Lucirin TPO, manufactured by BASF Japan Ltd.) in MEK was coated on a whole surface of a PET film (thickness: 100 µm) by the gravure printing method and cured into a film by cross-linking reaction by irradiation with a UV ray to form a primer layer having a film thickness of 1 µm, whereby a transparent substrate was prepared.

The liquid crystal ink was coated on the above transparent substrate by the gravure printing method so that dot patterns were formed, and the dots were oriented so that they had a cholesteric structure. Then, the liquid crystal ink was cured by cross-linking reaction by irradiation with a UV ray to obtain a pattern-printed transparent sheet. In respect to a size of the dots, a diameter of the disc was about 100 µm, and a thickness of the dots was 8 µm. The transparent sheet obtained was measured for a reflectance of a rectangular pattern (solid coated part) for measuring a reflectance by means of a spectrophotometer (incident angle: 5°, manufactured by Shimadzu Corporation) to find that a selective reflection wavelength peak of the coating film was 300 nm and that the reflectance was 20%. Further, a cross section of the sample prepared was observed under a scanning type microscope to find that the cholesteric liquid crystal had a multilayer structure comprising a fixed repetitive cycle and that a curved part was formed, as shown in FIG. 2, along an elliptic semispherical disc of the dot, and it was read by means of a pen type sensor which reflected an infrared ray to detect a reflected ray thereof in the form of an image to find that it could be read in a range of about 0 to 45° measured from a normal direction on the surface of the above transparent sheet.

Comparative Example 1

A solution prepared by dissolving 2 parts by mass of hydroxyethyl cellulose in 100 parts by mass of purified water was coated on a whole surface of a PET film by the gravure printing method, and it was dried and then heated at 100° C. to form a film, whereby a transparent substrate provided with an oriented film which was even on a whole surface was prepared. The same liquid crystal ink as in Example 1 was coated on the above transparent substrate to form a film. It was observed under a scanning type electron microscope to find that a repetitive layer structure of the cholesteric liquid crystal was observed as shown in FIG. 3. In respect to a size of the dots, a diameter of the disc was about 120 µm. Further, the transparent sheet obtained was measured for a reflectance of a rectangular pattern (solid coated part) for measuring a reflectance in the same manner as in Example 1 to find that a selective reflection wavelength peak of the coating film was 850 nm, but the reflectance was 2% since a thickness of the dots was 1 µm. The read angle thereof was only 0 degree measured from a normal direction on the surface of the above transparent sheet, and a width of the angle range which could be read was 0°.

Comparative Example 2

A film was prepared in the same manner as in Example 1, except that the leveling agent was not added to a primer layer formed on a TAC film. In respect to a size of the dots, a diameter of the disc was about 110 µm. The transparent sheet obtained was measured for a reflectance of a rectangular pattern (solid coated part) for measuring a reflectance in the same manner as in Example 1 to find that a selective reflection wavelength peak of the coating film was 850 nm and that the reflectance was 5%. The read angle thereof was only 0 degree measured from a normal direction on the surface of the above transparent sheet, and a width of the angle range which could be read was 0°.

Comparative Example 3

A solution prepared by dissolving 2 parts by mass of hydroxyethyl cellulose in 100 parts by mass of purified water was coated on a whole surface of a TAC film by the gravure printing method, and it was dried and then heated at 100° C. to form a film, whereby a transparent substrate provided with an oriented film was prepared. The same liquid crystal ink as in Example 2 was coated on the above transparent substrate to form a film. It was observed under a scanning type microscope to find that a repetitive layer structure of the cholesteric liquid crystal was formed as shown in FIG. 3. In respect to a size of the dots, a diameter of the disc was about 120 µm. The transparent sheet obtained was measured for a reflectance of a rectangular pattern (solid coated part) for measuring a reflectance in the same manner as in Example 2 to find that a selective reflection wavelength peak of the coating film was 300 nm, but the reflectance was 20% since a thickness of the dots was 1 µm. The read angle thereof was only 0 degree measured from a normal direction on the surface of the above transparent sheet, and a width of the angle range which could be read was 0°.

Comparative Example 4

A film was prepared in the same manner as in Example 2, except that the leveling agent was not added to a primer layer formed on a PET film. In respect to a size of the dots, a diameter of the disc was about 110 μm. The transparent sheet obtained was measured for a reflectance of a rectangular pattern (solid coated part) for measuring a reflectance in the same manner as in Example 2 to find that a selective reflection wavelength peak of the coating film was 300 nm and that the reflectance was 20%. The read angle thereof was only 0 degree measured from a normal direction on the surface of the above transparent sheet, and a width of the angle range which could be read was 0°.

INDUSTRIAL APPLICABILITY

As explained above in details, the pattern-printed transparent sheet of the present invention is a member which can be applied to a data input system of a type of handwriting directly on a screen of a display device and which provides a coordinate detect means, and it provides a broad read angle and therefore has a high practical performance. It can be used for various information processing devices including portable phones, various mobile terminals such as PDA and the like, personal computers, TV phones, TV endowed with an intercommunication function, internet terminals and the like.

Further, the pattern-printed transparent sheet of the present invention can be applied to other uses such as bar codes, optical input of answers onto an answer sheet of a written test, aim marks of a print whole cloth in a web press, patterns for identifying alteration and falsification of cash vouchers and other various information input, identification and position detect.

What is claimed is:

1. A pattern-printed transparent sheet in which a transparent substrate comprises a base material and a primer layer, and a non-visible light reflective transparent pattern is printed on a surface of the primer layer; an ink constituting the transparent pattern contains a material having a wavelength selective reflectivity to a wavelength in the infrared or ultraviolet region; the primer layer consists of a primer composition capable of repelling the ink; and when a cross section obtained by cutting the transparent pattern in a face orthogonal to the above transparent substrate is observed under a scanning electron microscope, the transparent pattern comprises a multilayer structure, wherein the multilayer structure includes a fixed repeating cycle and has a curved part, and wherein the transparent pattern reflects selectively either a left circularly polarized light component or a right circularly polarized light component of an incident light, and wherein the transparent pattern has a dot shape.

2. The pattern-printed transparent sheet as described in claim 1, wherein the material having a wavelength selective reflectivity is a cholesteric liquid crystal material, and the multilayer structure of the transparent pattern comprises a fixed cholesteric structure.

3. The pattern-printed transparent sheet as described in claim 2, wherein the cholesteric liquid crystal material comprises a chiral nematic liquid crystal material prepared by mixing a nematic liquid crystal with a chiral agent.

4. The pattern-printed transparent sheet as described in claim 3, wherein the nematic liquid crystal and the chiral agent have respectively cross-linkable functional groups, and the cholesteric structure is fixed by cross-linking the cross-linkable functional groups.

5. The pattern-printed transparent sheet as described in claim 3, wherein at least one of the nematic liquid crystal or the chiral agent have an acrylate structure.

6. The pattern-printed transparent sheet as described in claim 1, wherein the primer composition contains a liquid repelling leveling agent.

7. The pattern-printed transparent sheet as described in claim 1, wherein the primer composition contains at least one of a reactive monomer or a reactive oligomer.

8. The pattern-printed transparent sheet as described in claim 1, wherein the transparent pattern has a selective reflection peak wavelength in 800 to 950 nm.

9. The pattern-printed transparent sheet as described in claim 1, wherein the transparent pattern has a selective reflection peak wavelength in 200 to 400 nm.

10. The pattern-printed transparent sheet as described in claim 1, wherein the transparent pattern is a pattern in which reflected pattern of a non-visible light is read by an input terminal capable of irradiation and detection of a non-visible light and in which a position information of the input terminal on the transparent sheet can be provided.

11. The pattern-printed transparent sheet as described in claim 1, wherein the transparent sheet is installed oppositely to a front face of a display device capable of displaying images.

12. The pattern-printed transparent sheet as described in claim 11, which is equipped with an installing device for installation thereof onto the display device, the installing device including buckle shaped members which are hooked at corners of the display device and pinch members which pinch end parts of the display device.

13. The pattern-printed transparent sheet as described in claim 1, wherein the transparent sheet includes perforations therein, wherein the perforations are cuts in the transparent sheet that extend in a thickness direction in an amount less than the thickness of the transparent sheet.

* * * * *